(12) United States Patent
Haberstock et al.

(10) Patent No.: US 11,867,298 B2
(45) Date of Patent: Jan. 9, 2024

(54) SYSTEM PRESSURE VALVE FOR A HYDRAULIC SYSTEM OF A MOTOR VEHICLE TRANSMISSION

(71) Applicant: ZF Friedrichshafen AG, Friedrichshafen (DE)

(72) Inventors: Alexander Haberstock, Ravensburg (DE); Markus Herrmann, Scheidegg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 278 days.

(21) Appl. No.: 17/292,230

(22) PCT Filed: Oct. 7, 2019

(86) PCT No.: PCT/EP2019/077026
§ 371 (c)(1),
(2) Date: May 7, 2021

(87) PCT Pub. No.: WO2020/094310
PCT Pub. Date: May 14, 2020

(65) Prior Publication Data
US 2021/0404564 A1 Dec. 30, 2021

(30) Foreign Application Priority Data
Nov. 9, 2018 (DE) ............... 10 2018 219 113.1

(51) Int. Cl.
*F15B 21/00* (2006.01)
*F16K 11/07* (2006.01)
*F15B 13/02* (2006.01)

(52) U.S. Cl.
CPC ............ *F16K 11/07* (2013.01); *F15B 13/022* (2013.01); *F15B 2211/20576* (2013.01);
(Continued)

(58) Field of Classification Search
CPC ............ F16K 11/07; F15B 2211/20576; F15B 2211/4053; F15B 2211/428; F15B 2211/61; F15B 2211/7142
See application file for complete search history.

(56) References Cited

U.S. PATENT DOCUMENTS 10,794,468 B2 10/2020 Herrmann et al.
2002/0040603 A1 4/2002 Kemmner et al.
(Continued)

FOREIGN PATENT DOCUMENTS

DE 10041386 A1 3/2002
DE 102013214758 A1 1/2015
(Continued)

OTHER PUBLICATIONS

International Search Report (English Translation) PCT/EP2019/077026, dated Dec. 2, 2019. (2 pages).
(Continued)

Primary Examiner — Kelsey E Cary
(74) Attorney, Agent, or Firm — Dority & Manning, P.A.

(57) ABSTRACT

Saturation of a secondary system pressure circuit (18) of a hydraulic system (4) of a motor vehicle transmission is earlier, in that an excess amount of oil from a primary system pressure circuit (16) of the hydraulic system (4) is not directed to a suction charging (40), but rather into the secondary system pressure circuit (18). This can take place via a system pressure valve (9) for the primary system pressure circuit (16), which is configured for this function.

13 Claims, 6 Drawing Sheets

(52) U.S. Cl.
CPC . *F15B 2211/4053* (2013.01); *F15B 2211/428* (2013.01); *F15B 2211/61* (2013.01); *F15B 2211/7142* (2013.01)

(56) References Cited

U.S. PATENT DOCUMENTS

2016/0033031 A1     2/2016   Long et al.
2017/0045139 A1*   2/2017   Novak .................. F16H 61/688
2019/0093756 A1     3/2019   Herrmann et al.

FOREIGN PATENT DOCUMENTS

| | | |
|---|---|---|
| DE | 102016204399 A1 | 9/2017 |
| DE | 102016218186 A1 | 3/2018 |
| WO | WO 2012/112778 A2 | 8/2012 |
| WO | WO 2017/157606 A1 | 9/2017 |

OTHER PUBLICATIONS

German Search Report 102018219113.1, dated Aug. 29, 2019. (12 pages).

* cited by examiner

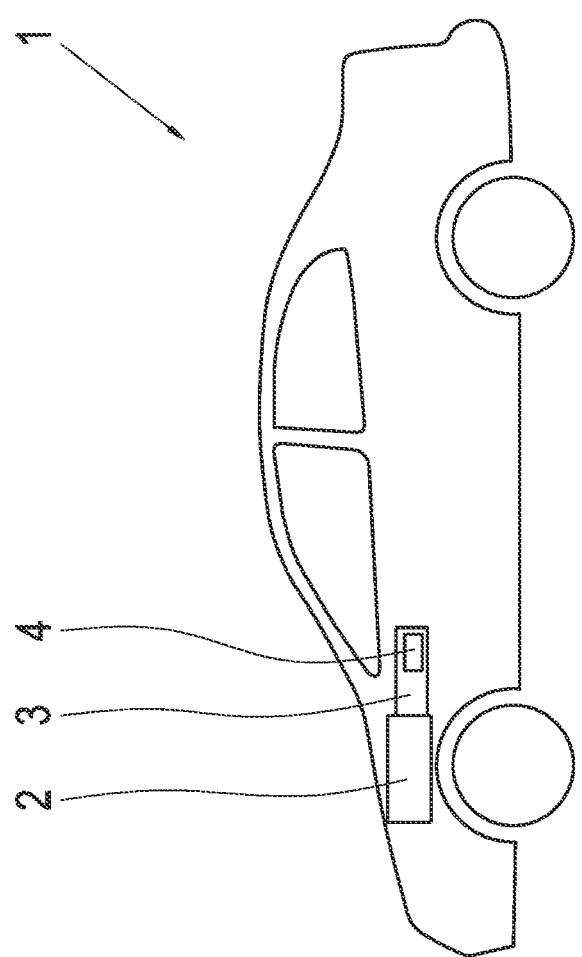

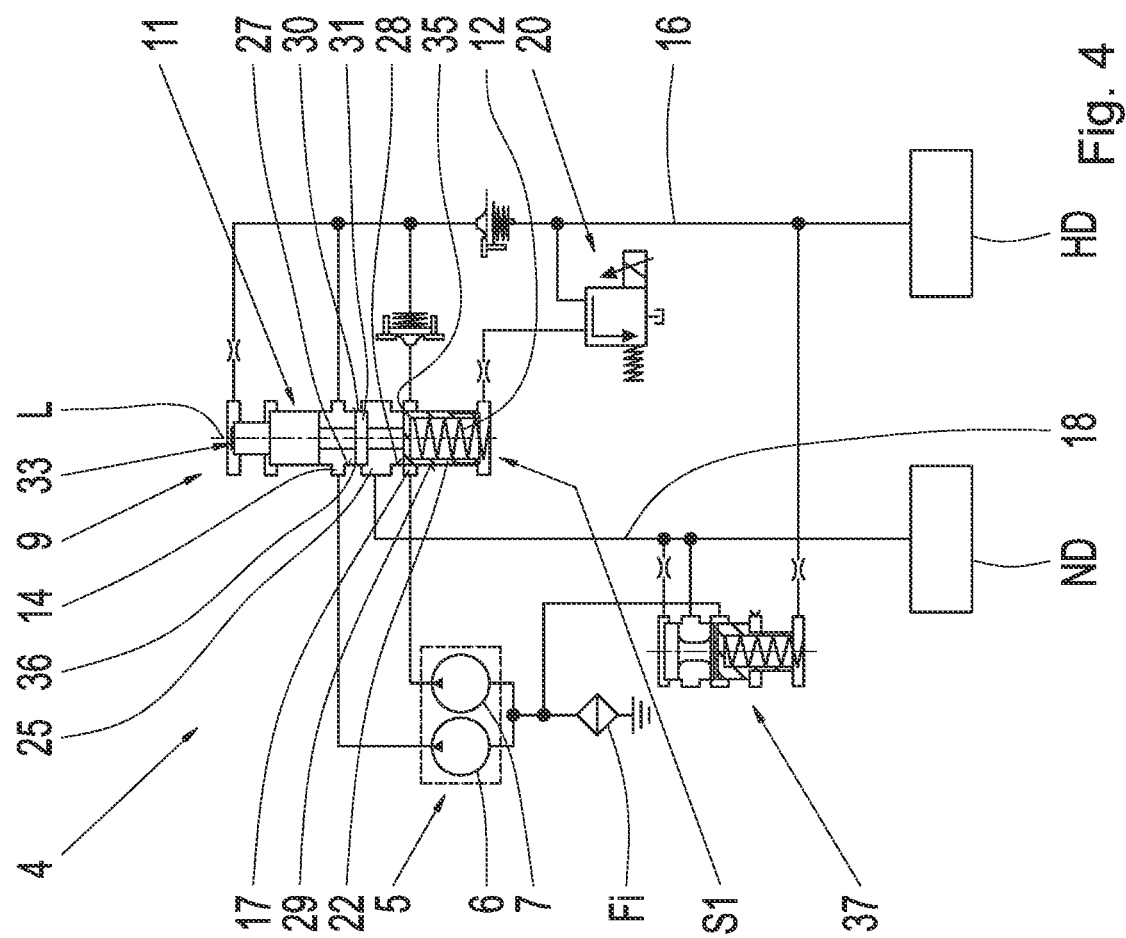

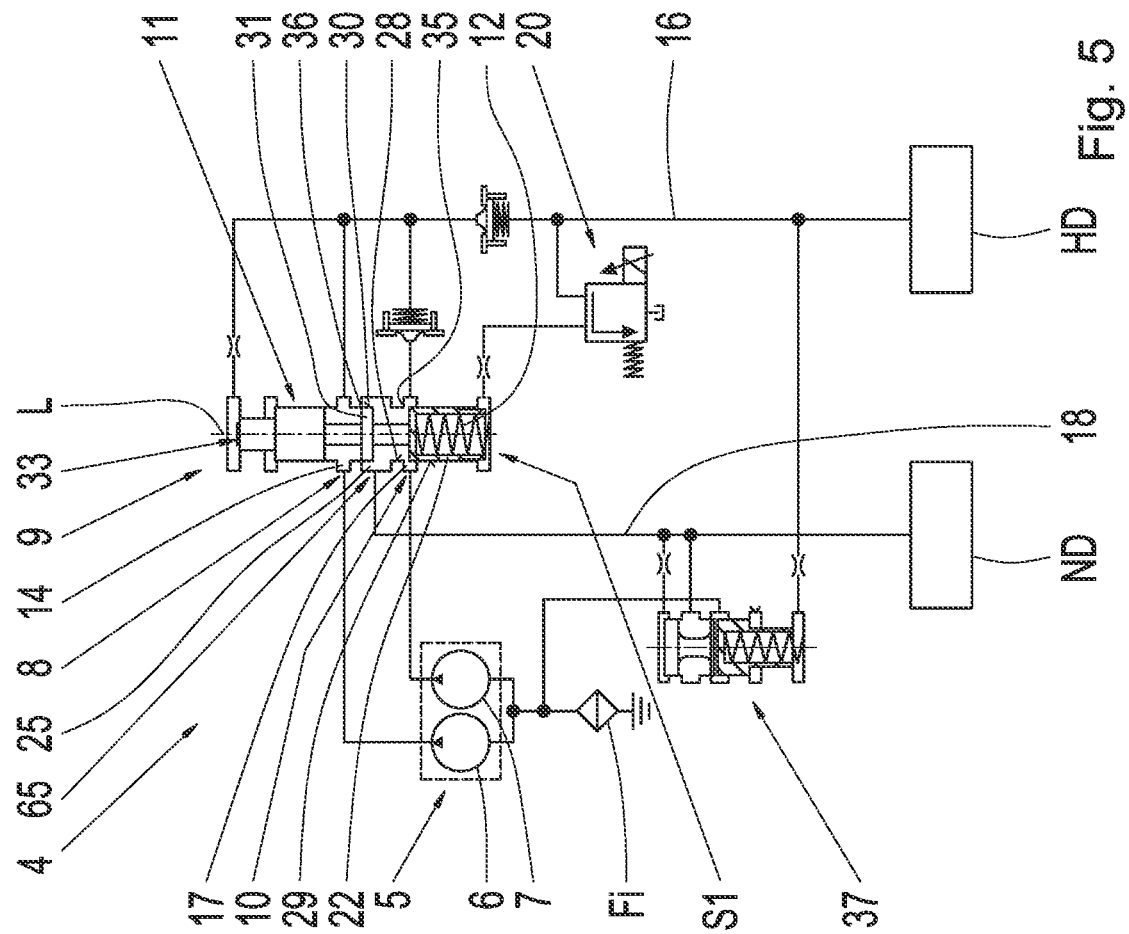

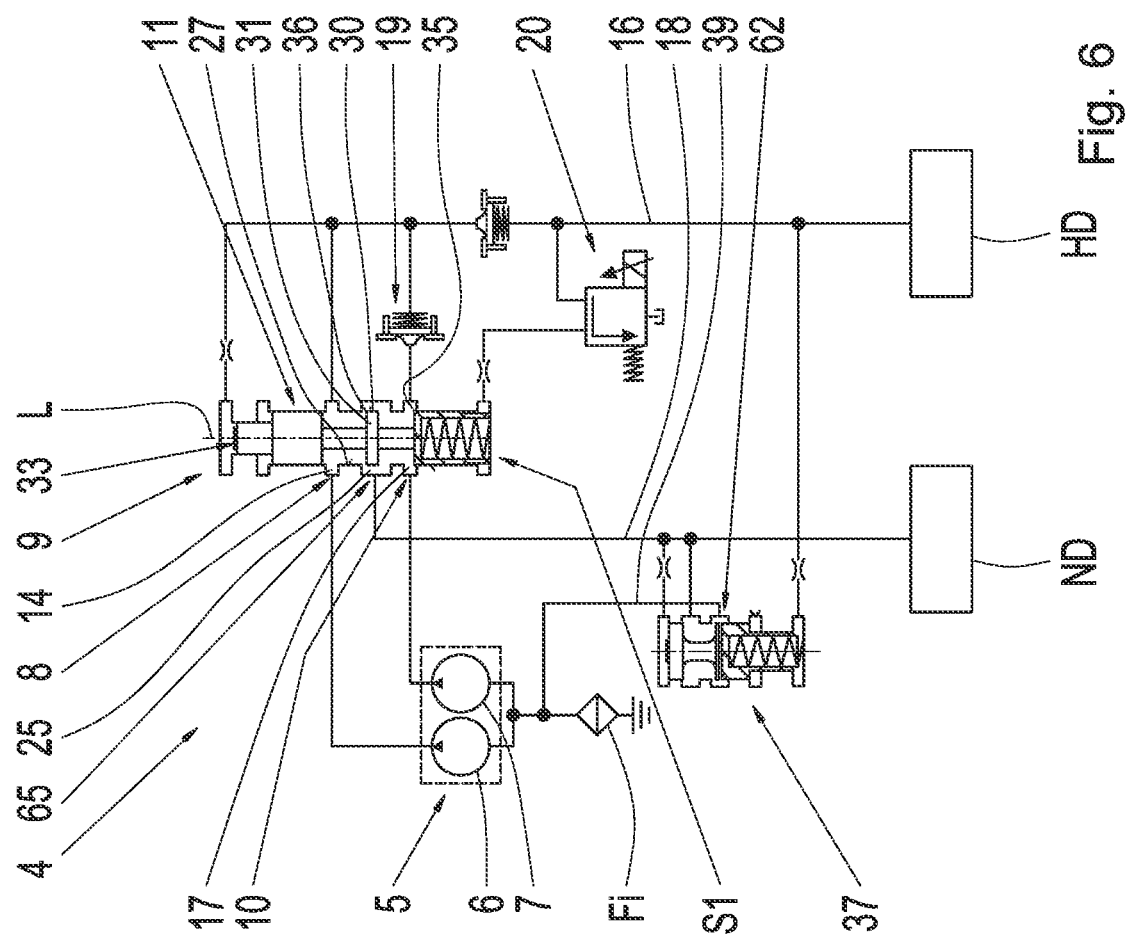

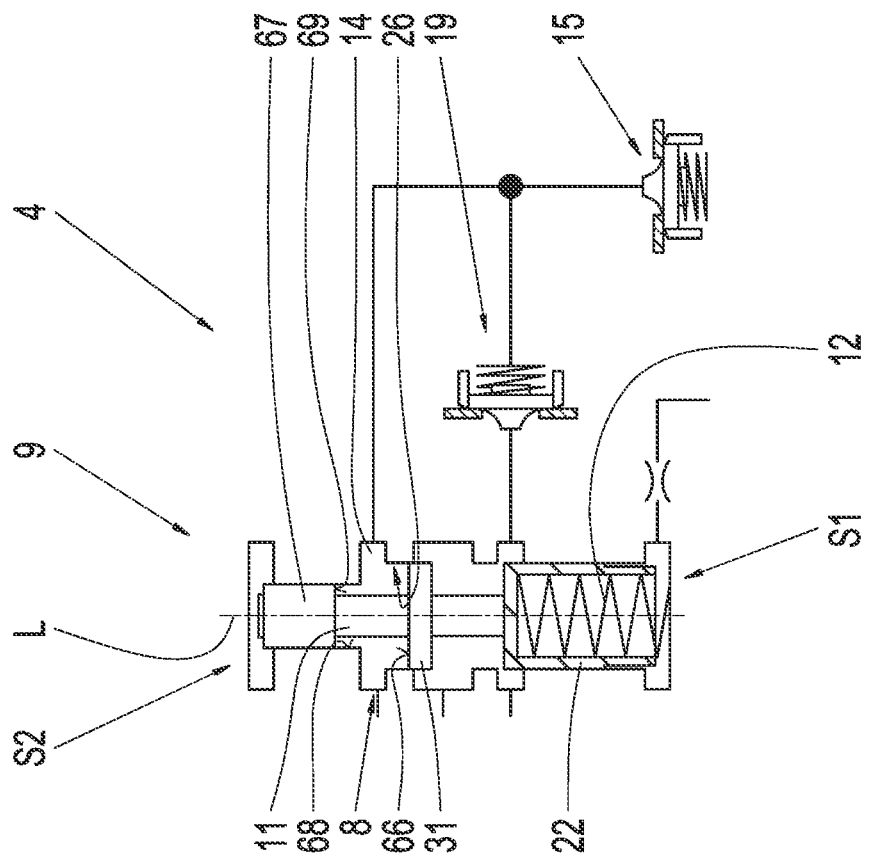
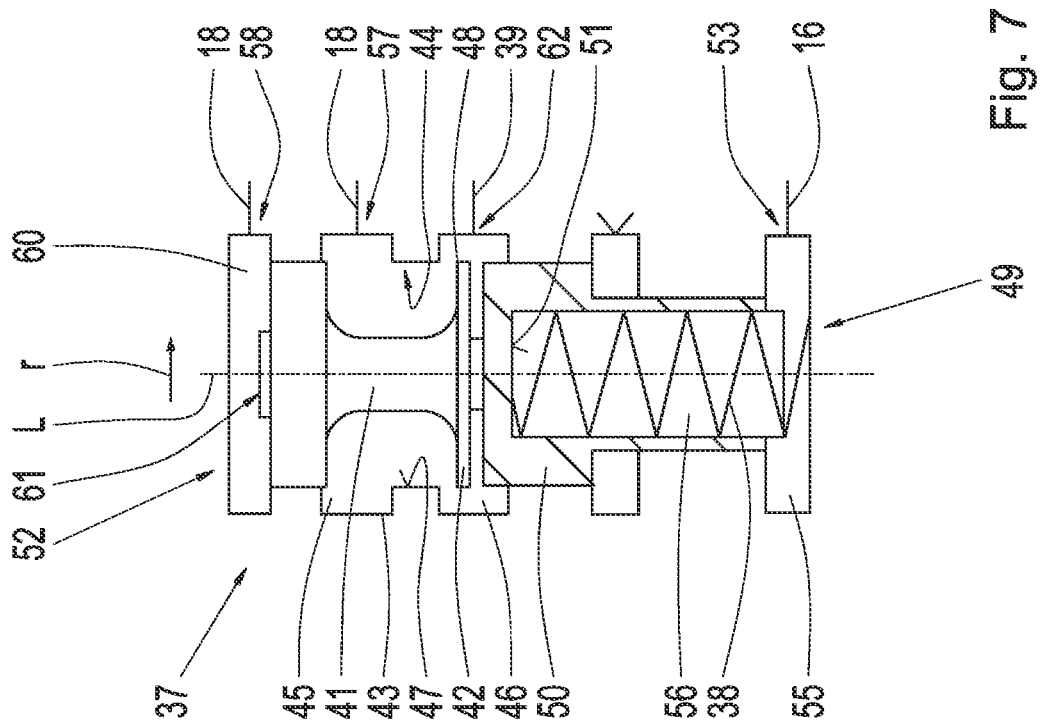

SYSTEM PRESSURE VALVE FOR A HYDRAULIC SYSTEM OF A MOTOR VEHICLE TRANSMISSION

CROSS-REFERENCE TO RELATED APPLICATIONS

The present application is related and has right of priority to German Patent Application No. 102018219113.1 filed in the German Patent Office on Nov. 9, 2018 and is a nationalization of PCT/EP2019/077026 filed in the European Patent Office on Oct. 7, 2019, both of which are incorporated by reference in their entirety for all purposes.

FIELD OF THE INVENTION

The invention relates generally to a system pressure valve for a hydraulic system of a motor vehicle transmission. Moreover, the invention relates generally to a hydraulic system with the system pressure valve, a motor vehicle transmission with the hydraulic system, and to a motor vehicle with the motor vehicle transmission.

BACKGROUND

Hydraulic systems, in particular for automatic transmissions of motor vehicles, are known, which include a high pressure circuit (primary system pressure circuit) and a low pressure circuit (secondary system pressure circuit). This type of hydraulic system typically includes two pumps, which can be designed as a double-stroke vane pump with a fixed (rotational speed-dependent) displacement. Each pump is associated with one of the two system pressure circuits (high pressure or low pressure). The functional principle is based on the fact that, when oil is lacking, the pump associated with the low pressure circuit (secondary pump) is switched to high pressure and can deliver into the high pressure circuit. As soon as the high pressure circuit has been saturated, the pressure of the secondary pump is reduced to a lower pressure level again. For this purpose, the hydraulic system can be designed to be self-regulating via a valve logic. In order to control, by way of a closed-loop system, the pressure in the high pressure circuit as well as in the low pressure circuits, two pressure control valves are needed. These valves control the pressure, by way of a closed-loop system, in that they drain off the excess oil delivered by the pumps. This oil is typically returned directly into a suction area of the pumps, in order to improve the filling performance and/or the cavitation tendency of the pump(s) at high rotational speeds (i.e., at high delivery rates).

This type of system can have the disadvantages described in the following, however. For example, in comparison to a single-circuit pump system, a saturation of the secondary circuit can shift toward higher pump speeds, since the excess amount of the high pressure circuit is directed into the suction area of the pumps and is not available to the secondary circuit. Due to the fact that both valves direct their excess amount to the pump suction side, a hydraulic control unit ("valve slide box") of the hydraulic system generally must still be designed in such a way that both valves are situated directly at the suction area of the pumps, which limits structural degrees of freedom. In addition, the pressure control valve for the high pressure circuit must be designed to be relatively long, so that the functions can be implemented, which can result in higher costs and further structural limitations.

BRIEF SUMMARY OF THE INVENTION

Example aspects of the present invention provide a cost-effective pressure control valve with reduced installation space, by which it is made possible for a low pressure circuit of a hydraulic system to be better supplied, and that, within the sense of an increase of degrees of freedom, system pressure valves can be structurally arranged within a hydraulic control unit in an easier way.

According to example aspects of the present invention, it is provided to saturate a secondary system pressure circuit of a hydraulic system of a motor vehicle transmission earlier, in that an excess amount from a primary system pressure circuit is not directed to a suction charging, but rather into the secondary system pressure circuit. This can take place via a system pressure valve for the primary system pressure circuit according to example aspects of the invention, which is configured for this function. In addition to the better supply of the secondary system pressure circuit, this redesign also provides the advantage that the system pressure valve of the primary system pressure circuit (primary system pressure valve) no longer has to be attached at the suction area of the pump. Only one system pressure valve of the secondary system pressure circuit (secondary system pressure valve) performs the function of directing the excess amount into the suction charging of the pump. As a result, degrees of freedom arise in the structural arrangement, since the primary system pressure valve can be more or less arbitrarily arranged in a hydraulic control unit. Particularly advantageously, the primary system pressure valve can be arranged in the proximity of the secondary system pressure valve, since the secondary system pressure valve can deliver into its oil circuit (the secondary system pressure circuit).

In this sense, according to a first example aspect of the invention, a system pressure valve for a hydraulic system of a motor vehicle transmission is made available. The system pressure valve can be, in particular, a primary system pressure valve, i.e., the system pressure valve can be associated with a primary system pressure circuit, in order to set an intended setpoint pressure level therein and, when the setpoint pressure level is reached or exceeded, drain hydraulic fluid, in particular oil, out of the primary system pressure circuit.

The system pressure valve includes a valve housing, a piston rod, a first inlet, a second inlet, a first outlet, a second outlet, and a third outlet. A primary pump of the hydraulic system can be connected to the first inlet. A secondary pump of the hydraulic system can be connected to the second inlet. A primary system pressure circuit of the hydraulic system can be connected to the first outlet and to the second outlet. A secondary system pressure circuit of the hydraulic system can be connected to the third outlet.

The system pressure valve can be configured for displacing the piston rod within the valve housing into a first switching position, into a second switching position, and into a third switching position.

In the first switching position, the third outlet is connected neither to the first inlet nor to the second inlet. The feature "connected" is to be understood, in particular, to mean that the particular elements connected to each other are hydraulically conductively connected to each other, i.e., that a hydraulic fluid, in particular oil, can flow from the one element to the other element and, if necessary, vice versa. The first inlet can be connected to the first outlet. In addition, the second inlet can be connected to the second outlet. This can be the case, in particular, regardless of the particular switching position of the piston rod, i.e., the aforementioned connections can exist in the first switching position, in the second switching position, the third switching position, as well as in intermediate positions between the aforementioned switching positions. Thus, in the first switching position, the primary system pressure circuit can be supplied with a first oil flow by the primary pump and with a secondary oil flow by the secondary pump, in order to build up pressure within the primary system pressure circuit. The primary system pressure circuit is not yet saturated (a setpoint pressure level within the primary system pressure circuit has not yet been reached) and the secondary system pressure circuit is not supplied, since a connection does not exist between the primary pump and the secondary pump via the first inlet and the second inlet (inlet-side) and the third outlet (outlet-side).

In the second switching position, the second inlet is connected to the third outlet. If the delivery rate of the primary pump and of the secondary pump suffices for reaching the setpoint pressure level within the primary system pressure circuit, the valve piston can move into the second switching position due to an imbalance of forces. As a result, oil of the secondary pump, which is not needed for saturating the primary system pressure circuit, can be directed into the secondary circuit via the connection between the second inlet and the third outlet, and the pressure level in the primary system pressure circuit can be maintained.

If the delivery rate of the primary pump and of the secondary pump is increased (by increasing the pump speed) to such an extent that the primary pump alone can saturate the primary system pressure circuit, the primary system pressure valve can displace the control piston into the third switching position, and so an excess amount of delivered oil of the primary system pressure circuit is combined, within the system pressure valve, with a delivery of the secondary pump. In the third switching position, the third outlet is connected both to the first inlet and to the second inlet.

If the pump speed is increased once more, the delivery rate can suffice for saturating the secondary system pressure circuit. A secondary system pressure valve of the secondary system pressure circuit, which is described in greater detail further below, can then enter into closed-loop control, in that the secondary system pressure valve returns an excess amount of oil within the secondary system pressure circuit, via a line, to a pump suction side. Therefore, the primary system pressure circuit and the secondary system pressure circuit are saturated.

A first piston of the piston rod of the system pressure valve of the primary system pressure circuit can be arranged in the area of a first end surface of the piston rod and of the primary system pressure valve. A second piston can be arranged at the piston rod in an axial direction of the system pressure valve at a distance from the first piston. In addition, the second piston can extend in the radial direction of the primary system pressure valve to a first section of a guide surface, which is formed by the valve body of the system pressure valve.

In one example embodiment, the piston rod is preloaded in the first switching position by a restoring element. The restoring element can generate a preload force. Due to the restoring force, the piston rod tends to remain in the first switching position. In particular, due to the preload force, the piston rod can remain in the first switching position, provided the hydraulic pressure is below the first limiting value. For example, the first piston can be designed to be cup-shaped. The cup-shaped piston can form an interior space and an inner surface, for example, a circular surface. The inner surface can extend perpendicularly to a possible displacement direction of the piston rod. The restoring element can include, for example, a spring. The spring can be arranged, for example, within the interior space of the cup-shaped piston and generate a restoring force in the form of a spring force, which acts on the inner surface.

In a further example embodiment, the system pressure valve is configured for acting upon an end surface of the piston rod with a hydraulic pressure, and so the piston rod moves into the second switching position or into the third switching position. The hydraulically effective end surface can be arranged in an area of a second end surface of the piston rod and of the system pressure valve. The hydraulically effective end surface and the restoring element can therefore be located on opposite end surfaces of the piston rod. The hydraulically effective end surface can be connected to the primary system pressure circuit via an inlet of the system pressure valve. The pressure prevailing within the primary system pressure circuit can therefore induce a displacement force, which acts perpendicularly upon the hydraulically effective end surface of the piston rod and is directed counter to the preload force of the spring and counter to the pilot force corresponding to the pilot pressure. Therefore, the piston rod can be moved, by the displacement force, out of the first switching position into the second switching position. If the piston rod is already in the second switching position, the piston rod can be moved out of this second switching position into the third switching position by the displacement force.

Moreover, the system pressure valve can be configured for acting upon an internal return surface of a piston of the piston rod with a hydraulic pressure, and so the piston rod moves into the second switching position or into the third switching position. The piston can be, in particular, the above-described second piston. The hydraulic pressure can be, in particular, the pressure prevailing in a valve pocket of the primary system pressure valve, which can act upon the internal return surface. Thus, a pressure feedback can be implemented in the primary system pressure valve via an internal return surface, as the result of which the primary system pressure valve can be designed to be particularly short, since a valve collar and a valve pocket can be saved. The feature "internal" can be understood, in particular, to mean that the return surface is located within the valve housing, in particular within the valve pocket, i.e., internally.

The piston rod can include a third piston, which can be arranged at a distance from the second piston farther in the direction of the second end surface of the primary system pressure valve. The diameter of the third piston can be smaller than the diameter of the second piston and can be displaced back and forth within a suitable guide surface. Therefore, the third piston can include a hydraulically effective surface, which is smaller than the return surface. The pressure within a valve pocket of the system pressure valve can act upon the hydraulically effective surface of the third piston as well as upon the return surface of the second piston. Since the hydraulically effective surface of the third piston is smaller than the return surface of the second piston, the pressure within the valve pocket can induce a displacement force, which counteracts the above-described restoring force, in particular the spring force of the spring, and the pilot force.

Regardless of whether, for example, the hydraulically effective end surface or the internal return surface is acted upon by the hydraulic pressure, the piston rod can move into the first switching position or into the second switching position, depending on the level of the hydraulic pressure.

In this sense, it is provided according to a further example embodiment that the system pressure valve is configured for displacing the piston rod within the valve housing out of the first switching position into the second switching position—by loading the piston rod with a hydraulic pressure—as soon as the hydraulic pressure exceeds a first limiting value. The first limiting value can be the setpoint pressure level within the primary system pressure circuit. Provided the first limiting value has not yet been exceeded, an equilibrium of forces can prevail, which holds the piston rod in the first switching position. In other words, the hydraulic pressure effective upon the hydraulically effective end surface does not yet suffice for moving the piston rod in the axial direction counter to the spring force and the pilot force. As soon as the hydraulic pressure exceeds the first limiting value, however, in particular when the setpoint pressure level has been reached within the primary system pressure circuit, the hydraulic pressure induces a displacement force, which acts perpendicularly upon the hydraulically effective end surface of the piston rod and is directed counter to the preload force of the spring and to the pilot force corresponding to the pilot pressure. The equilibrium of forces between the spring force and the pilot force, on the one hand, and the displacement force, on the other hand, is no longer present, and so the piston rod is displaced in the axial direction toward the first end surface into the first switching position, in order to re-establish an equilibrium of forces.

In addition, the system pressure valve can be configured for displacing the piston rod within the valve housing out of the second switching position into the third switching position—by loading the piston rod with the hydraulic pressure—as soon as the hydraulic pressure exceeds a second limiting value, wherein the second limiting value is higher than the first limiting value.

In a further example embodiment, the system pressure valve includes a first valve pocket, a second valve pocket, and a third valve pocket. The three aforementioned valve pockets can be formed, in particular, by the valve housing of the system pressure valve. The valve pockets described in the present application can be cavities within the valve housing. The cavities can be filled by the piston rod in the area of an axial valve bore of the valve housing. In particular, the valve pockets described in the present application can each extend farther outward in a radial direction of the primary system pressure valve than an inner guide surface for the piston rod extending in the axial direction and/or than the axial valve bore of the valve housing. The valve pockets can form an, in particular, toroidal, pressure chamber, which projects beyond the axial valve bore in the radial direction of the system pressure valve. This pressure chamber can be filled with oil and, in fact, also, in particular, for the case in which a piston of the piston rod closes the pressure chamber toward the radially farther inward situated interior space of the valve housing. The guide surface and/or the axial valve bore can correspond to the particular diameter of the piston rod or have a slightly larger diameter than the piston rod, and so the piston rod can be displaced back and forth within the guide surface and/or the valve bore in the axial direction of the primary system pressure valve in the most friction- and wear-free manner possible. In addition, the valve pockets can each be connected to one or several port(s) of the system pressure valve. One or several valve pocket(s) can be separated from one another or connected to one another by the piston rod.

The first valve pocket is connected to the first inlet and to the first outlet. The second valve pocket is connected to the second inlet and to the second outlet, and the third valve pocket is connected to the third outlet. The piston rod, in the first switching position, separates the first valve pocket and the second valve pocket from the third valve pocket. In the second switching position, the piston rod releases a connection of the second valve pocket and the third valve pocket. In the third switching position, the piston rod releases a connection between the first valve pocket and the third valve pocket as well as a connection between the second valve pocket and the third valve pocket.

According to example aspects of the present invention, it is provided to not direct an excess amount of oil within the primary system pressure circuit into the secondary circuit via a line "outside" the primary system pressure circuit. Instead, an excess amount of oil of the primary system pressure circuit can be combined in the third valve pocket via a harmonization of control edges within the primary system circuit. As a result, the valve can be designed to be shorter and installation space can be saved, which, in turn, simplifies the structural arrangement. In this sense, it is provided according to a further example embodiment that the first piston rod includes a piston with a primary control edge, and that the first piston rod includes a further piston with a secondary control edge. The piston rod can be configured for releasing the connection between the second valve pocket and the third valve pocket via the secondary control edge. In addition, the piston rod can be configured for releasing the connection between the first valve pocket and the third valve pocket via the primary control edge. If the piston rod is displaced into the third switching position, a pressure drop can arise due to an opening of the cross-section arising at the secondary control edge. A retention valve and/or check valve arranged downstream from the second outlet can close due to a resultant pressure difference and, thereafter, a pressure in the secondary pump can be reduced.

According to a second example aspect of the invention, a hydraulic system for motor vehicle transmission is made available. The hydraulic system includes a primary pump, a secondary pump, a primary system pressure circuit, a secondary system pressure circuit, and a primary system pressure valve according to the above-described first example aspect of the invention. In the hydraulic system, the primary pump is connected to the first inlet of the primary system pressure valve. The secondary pump is connected to the second inlet of the primary system pressure valve. The primary system pressure circuit is connected to the first outlet of the primary system pressure valve and to the second outlet of the primary system pressure valve, and the secondary system pressure circuit is connected to the third outlet of the primary system pressure valve.

In one example embodiment, the hydraulic system can also include a system pressure regulator, which can be configured for outputting a pilot pressure, which can be supplied to the primary system pressure valve, and so a preload force of the restoring element is supported. The interior space of the cup-shaped piston of the piston rod of the primary system pressure valve can be connected to a fourth inlet of the primary system pressure valve. This fourth inlet can be connected to an outlet of the system pressure regulator, which outputs the pilot pressure. For this purpose, the system pressure regulator can include a variably adjustable, electric pressure control valve. An inlet of the system pressure regulator can be connected to the primary system pressure circuit, which supplies an oil flow to the system pressure regulator. The pilot pressure generated by the system pressure regulator, which assumes, for example, values between zero (0) bar and eight (8) bar, can be variably adjusted by a variable solenoid. The pilot pressure can act upon the inner surface of the cup-shaped piston, as the result of which this inner surface becomes hydraulically effective. In conjunction with the spring force and the pilot pressure, a setpoint pressure level, for example, between three (3) bar and twenty (20) bar, within the primary system pressure circuit can be predefined and set via a valve ratio of the system pressure valve.

The hydraulic system can also include a further system pressure valve ("secondary system pressure valve"), which is configured for predefining and setting a system pressure within the secondary system pressure circuit. In addition, the further system pressure valve is configured for connecting the secondary system pressure circuit to a suction side of the primary pump and of the secondary pump when the predefined system pressure is exceeded.

According to a third example aspect of the invention, a transmission, in particular an automatic transmission, for a motor vehicle is made available. The transmission includes a hydraulic system according to the second example aspect of the invention.

According to a fourth example aspect of the invention, a motor vehicle is made available, which includes a transmission according to the third example aspect of the invention.

BRIEF DESCRIPTION OF THE DRAWINGS

Exemplary embodiments of the invention are explained in greater detail in the following with reference to the diagrammatic drawings, wherein identical or similar elements are labeled with the same reference numbers. In the drawings:

FIG. 1 shows a vehicle with an automatic transmission, which includes an exemplary embodiment of a hydraulic system according to example aspects of the invention;

FIG. 4 shows the hydraulic system according to FIG. 2 in a second operating condition;

FIG. 5 shows the hydraulic system according to FIG. 2 in a third operating condition;

FIG. 6 shows the hydraulic system according to FIG. 2 in a fourth operating condition;

FIG. 7 shows an enlarged representation of a secondary system pressure valve of the hydraulic system according to FIG. 2; and FIG. 8 shows a portion of the hydraulic system according to FIG. 2 with an alternative primary system pressure valve.

DETAILED DESCRIPTION

Figure 3:
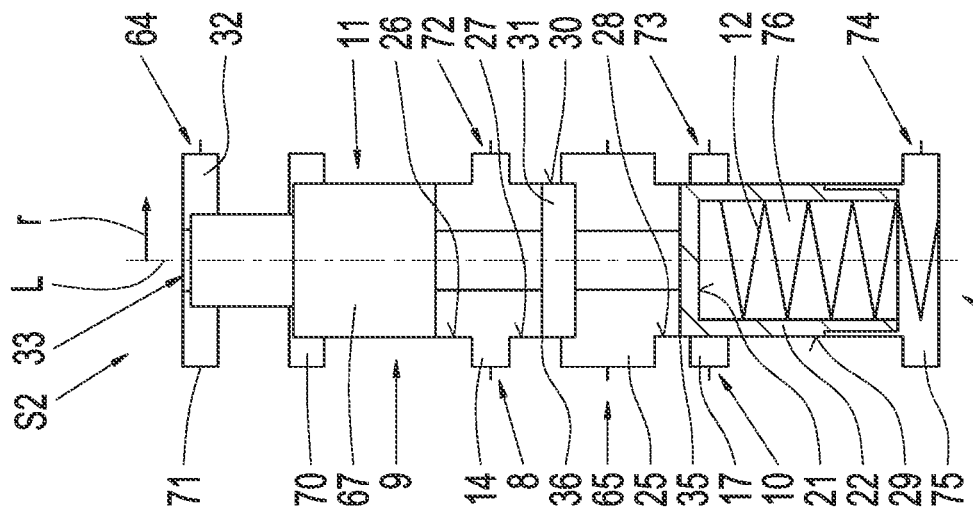
FIG. 3 shows an enlarged representation of a primary system pressure valve of the hydraulic system according to FIG. 2.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 1, specifically a passenger car in the example shown. The motor vehicle 1 includes an internal combustion engine 2, which drives the motor vehicle 1 via an automatic transmission 3, which includes a hydraulic system 4.

Figure 2:
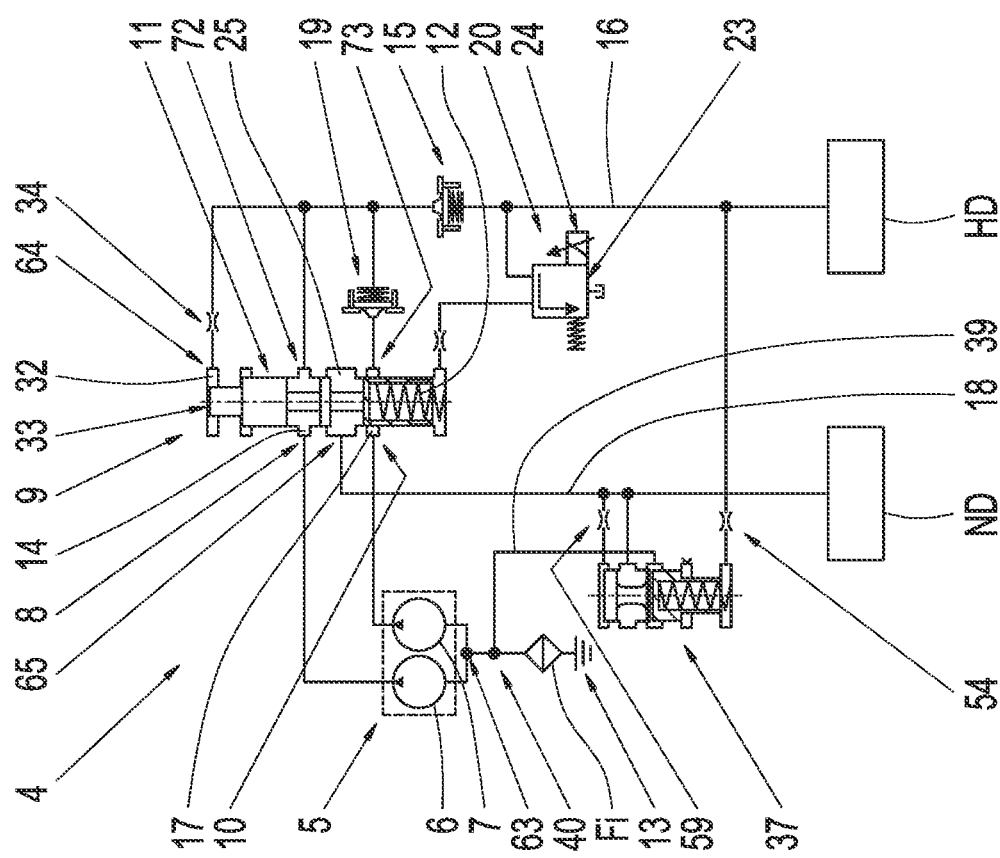
FIG. 2 shows a hydraulic circuit diagram of a portion of a hydraulic system in a first operating condition for use in the automatic transmission according to FIG. 1.

FIG. 2 shows a portion of a circuit diagram of the hydraulic system 4 according to FIG. 1. The hydraulic system 4 includes a pump system 5, specifically a dual pump system in the exemplary embodiment shown. The pump system 5 includes a primary pump 6 and a secondary pump 7, which can be driven, for example, by the internal combustion engine 2 of the motor vehicle 1 (FIG. 1).

The primary pump 6 and the secondary pump 7 can be two pumps separated from each other. However, the pump system 5 can also combine the primary pump 6 and the secondary pump 7 in a single pump, for example, in a double-stroke vane pump. The double-stroke vane pump can have a primary displacement chamber and a secondary displacement chamber. A rotor of the double-stroke vane pump can be driven by the internal combustion engine 2. When the rotor is rotating, the vane pump can deliver a primary oil flow out of the primary displacement chamber via a primary outlet and a secondary oil flow out of the secondary displacement chamber via a secondary outlet. The outlet of the primary pump 6 can be connected at a first inlet 8 of a primary system pressure valve 9. The outlet of the secondary pump 7 can be connected at a second inlet 10 of the primary system pressure valve 9. The primary system pressure valve 9 is a pressure control valve, which is configured for limiting a pressure prevailing within a primary system pressure circuit 16 (high pressure circuit HD).

The primary system pressure valve 9 includes a piston rod 11, which is accommodated so as to be axially displaceable back and forth within a valve body and/or a valve housing 71 of the primary system pressure valve 9. In addition, the piston rod 11 is axially preloaded in the first switching position shown in FIG. 2 by a return means, specifically by a spring 12 in the exemplary embodiment shown. For the sake of greater clarity, a few reference characters of the primary system pressure valve 9 are shown only in the enlarged representation in FIG. 3.

In the first switching position of the piston rod 11 of the primary system pressure valve 9 shown in FIG. 2, the primary pump 6, provided the primary pump 6 is driven, for example, by the internal combustion engine 2, can supply the primary system pressure circuit 16 with the primary oil flow. In particular, the primary pump 6 can scavenge hydraulic fluid in the form of oil out of a reservoir for hydraulic fluid in the form of an oil sump 13 across a filter Fi. The primary pump 6 can deliver the scavenged oil via the first inlet 8 of the primary system pressure valve 9 into a first valve pocket 14, which is formed within the primary system pressure valve 9 by the valve housing 71. Via a first outlet 72 of the primary system pressure valve 9, the oil can be delivered into the primary system pressure circuit 16 by the pressure generated by the primary pump 6 via a line and via a first retention valve 15, in order to set an intended pressure within the primary system pressure circuit 16.

In the first switching position of the piston rod 11 of the primary system pressure valve 9 shown in FIG. 2, the secondary pump 7, provided the secondary pump 7 is driven, for example, by the internal combustion engine 2, can supply the primary system pressure circuit 16 with the secondary oil flow in a similar way. In particular, the secondary pump 7 can scavenge oil out of the oil sump 13 across the filter Fi and deliver the oil into the primary system pressure circuit 16 via the second inlet 10 of the system pressure valve 9, a second valve pocket 17 formed within the primary system pressure valve 9 by the valve housing 71, the second outlet 73, and a second retention valve 19.

A secondary system pressure circuit 18 (low pressure circuit ND) is not supplied with pressure in the switching position shown in FIG. 2, since the pressure-side outlets of the primary pump 6 and of the secondary pump 7 are not connected to the secondary system pressure circuit 18. The second retention valve 19 prevents oil delivered by the primary pump 6 via the first valve pocket 14 in the direction of the primary system pressure circuit 16 from flowing in the direction of the secondary pump 7 via the second valve pocket 17. In addition, the hydraulic system 4 includes a secondary system pressure valve 37, the configuration and mode of operation of which are explained in greater detail further below.

In the switching position shown in FIG. 2, the primary system pressure circuit 16 is not yet saturated. A setpoint pressure level within the primary system pressure circuit 16 has not yet been reached. The setpoint pressure level can be controlled via an energization of a system pressure regulator 20. An output pressure of the system pressure regulator 20, the pilot pressure, can act upon an inner hydraulically effective surface, specifically upon a circular surface 21 in the exemplary embodiment shown. For this purpose, an outlet of the system pressure regulator 20 is connected to a fourth inlet 74 of the primary system pressure valve 9. The fourth inlet 74 opens into a fifth valve pocket 75, which is formed by the valve housing 71 of the primary system pressure valve 9 and is connected to an interior space 76 of a first cup-shaped piston 22 of the primary system pressure valve 9.

The inner hydraulically effective circular surface 21 is formed by the first cup-shaped piston 22 in the interior space 76. The preload force in the form of the spring force of the spring 12 also acts upon the inner hydraulically effective circular surface 21. The inner hydraulically effective surface 21 extends perpendicularly to a possible displacement direction L of the piston rod. The displacement direction L can coincide with an axial direction L of the primary system pressure valve 9.

The pilot pressure can be, for example, between zero (0) bar and eight (8) bar. The primary system pressure valve 9 has a valve ratio, by which a setpoint pressure level, for example, between three (3) bar and twenty (20) bar, within the primary system pressure circuit 16 can be predefined and set. For example, a pilot pressure of eight (8) bar can result in a maximum pressure of twenty (20) bar within the primary system pressure circuit 16 due to the valve ratio of the primary system pressure valve 9. In addition, for example, a pilot pressure of zero (0) bar can result in a minimum pressure of three (3) bar within the primary system pressure circuit 16 due to the valve ratio of the primary system pressure valve 9.

The cup-shaped piston 22 is arranged at a first end surface S1 (represented at the bottom in FIGS. 2 and 3) of the piston rod 11 and of the primary system pressure valve 9. The system pressure regulator 20 includes a variably adjustable, electric pressure control valve 23 supplied by the primary system pressure circuit. An inlet of the pressure control valve 23 is connected to the primary system pressure circuit 16, which supplies an oil flow to the pressure control valve 23. An input pressure of the pressure control valve 23 can therefore correspond to the pressure prevailing within the primary system pressure circuit 16.

The output pressure pa of the system pressure regulator 20 can be variably adjusted by a variable solenoid 24. The solenoid 24 can be energized, and so a magnetic force is induced. By the magnetic force, for example, a ball seat or a slide valve of the pressure control valve 23 can be actuated, as the result of which a certain output pressure pa and/or pilot pressure can be set. The output pressure pa can be, for example, at the maximum (for example, eight (8) bar) when no current is applied at the variable solenoid 24. The output pressure pa can be, for example, at the minimum (for example, zero (0) bar) when a maximum intended current is applied at the variable solenoid 24. In this way, the output pressure pa can be variably set. Thus, a control pressure acting in the direction of the preload force of the spring 12 can also be variably set.

The output pressure pa can be set relatively high by an appropriate energization. A control pressure acting in the direction of the preload force of the spring 12 therefore results, which strengthens the preload force of the spring 12. Therefore, the piston rod 11 tends to remain in a first switching position shown in FIGS. 2 and 3. In this first switching position, the first valve pocket 14 is not connected to a third valve pocket 25, which is connected to the secondary system pressure circuit 18. The second valve pocket 17 is also not connected to the third valve pocket 25.

The first valve pocket 14, the second valve pocket 17, and the third valve pocket 25 can each extend farther outward in a radial direction r of the primary system pressure valve 9 than an inner guide surface 26 for the piston rod 11. The guide surface 26 can have a slightly larger diameter than the piston rod 11, and so the piston rod 11 can be displaced back and forth within the guide surface 26 in the axial direction L of the primary system pressure valve 9 in the most friction- and wear-free manner possible. A first section 27 of the guide surface 26 extends from the first valve pocket 14 to the third valve pocket 25, and a second section 28 of the guide surface extends from the second valve pocket 17 to the third valve pocket 25.

In the first switching position of the piston rod 11 of the primary system pressure valve 9 shown in FIGS. 2 and 3, a radially outer surface 29 of the cup-shaped piston 22 rests against the second section 28 of the guide surface 26. The radially outer surface 29 of the cup-shaped piston 22 closes a possible connection between the second valve pocket 17 and the third valve pocket 25 via a secondary control edge 35 of the cup-shaped piston 22. In addition, in the first switching position of the piston rod 11 shown in FIGS. 2 and 3, a radially outer surface 30 of a second piston 31 of the piston rod 11 rests against the first section 27 of the guide surface 26. The radially outer surface 30 of the second piston 31 closes a possible connection between the first valve pocket 14 and the third valve pocket 25 via a primary control edge 36 of the second piston 31. The second piston 31 is arranged at the piston rod 11 at a distance from the cup-shaped piston 22 in the axial direction L of the primary system pressure valve 9 and extends in the radial direction r of the primary system pressure valve 9 to the first section 27 of the guide surface 26.

In the exemplary embodiment shown in FIG. 2, the system pressure valve 11 includes a fourth valve pocket 32 formed by the valve housing 71 in the area of a second end surface S2 (represented at the top in FIGS. 2 and 3) of the piston rod 9 and of the primary system pressure valve 11. In the first switching position of the piston rod 11 shown in FIG. 2, a hydraulically effective end surface 33 of the piston rod 11 (for example, a circular surface) is located within the fourth valve pocket 32. The fourth valve pocket 32 is connected to the primary pump 6 via the first valve pocket 14 and to the secondary pump 7 via the second valve pocket 17, specifically via a third inlet 64 and via a first restrictor 34 in the exemplary embodiment shown. The hydraulic pressure generated by the primary pump 6 and by the secondary pump 7 can therefore induce a displacement force, which acts perpendicularly upon the hydraulically effective end surface 33 of the piston rod 11 and is directed counter to the preload force of the spring 12 and the pilot force corresponding to the pilot pressure. The aforementioned hydraulic pressure can correspond to the pressure prevailing within the primary system pressure circuit 16, in particular when the first retention valve 15 is open.

In the condition shown in FIG. 2, in which the setpoint pressure level within the primary system pressure circuit 16 has not yet been reached, an equilibrium of forces prevails, which holds the piston rod 11 in the first switching position. In other words, the displacement force effective upon the hydraulically effective end surface 33 does not yet suffice for moving the piston rod 11 in the axial direction L counter to the spring force and counter to the pilot force.

In the operating condition of the hydraulic system 4 shown in FIG. 4, the rotational speed of the primary pump 6 and the rotational speed of the secondary pump 7 are increased for as long as it takes for the setpoint pressure level within the primary system pressure circuit 16, for example, ten (10) bar, predefined by the system pressure regulator 20 to be reached. This pressure of, for example, ten (10) bar, induces—as described above—a displacement force, which acts perpendicularly upon the hydraulically effective end surface 33 of the piston rod 11 and is directed counter to the preload force of the spring 12 and to the pilot force corresponding to the pilot pressure. As soon as the setpoint pressure level within the primary system pressure circuit 16 has been reached, the equilibrium between the spring force and the pilot force, on the one hand, and the displacement force, on the other hand, no longer exists, and so the piston rod 11 is displaced in the axial direction toward the first end surface S1 into a switching position, as shown in FIG. 4.

In this switching position according to FIG. 4, an equilibrium of forces between the spring force and the pilot force, on the one hand, and the displacement force, on the other hand, has not yet been re-established. In the switching position shown in FIG. 4, the radially outer surface 29 of the cup-shaped piston 22 still rests against the second section 28 of the guide surface 26. The radially outer surface 29 of the cup-shaped piston 22 still closes a possible connection between the second valve pocket 17 and the third valve pocket 25 via the secondary control edge 35. In addition, in the switching position of the piston rod 11 shown in FIG. 4, the radially outer surface 30 of the second piston 31 of the piston rod 11 rests against the first section 27 of the guide surface 26. The radially outer surface 30 of the second piston 31 still closes a possible connection between the first valve pocket 14 and the third valve pocket 25 via the primary control edge 36.

In the operating condition of the hydraulic system 4 shown in FIG. 5, the attained setpoint pressure within the primary system pressure circuit 16 still induces a displacement force, which acts perpendicularly onto the hydraulically effective end surface 33 of the piston rod 11 and is directed counter to the preload force of the spring 12 and to the pilot force corresponding to the pilot pressure. The displacement force is still sufficiently high such that the piston rod 11 is displaced in the axial direction toward the first end surface S1 into a second switching position, which is shown in FIG. 5.

In the second switching position of the piston rod 11 according to FIG. 5, the radially outer surface 29 of the cup-shaped piston 22 no longer rests against the second section 28 of the guide surface 26. Therefore, the cup-shaped piston 22 releases the connection between the second valve pocket 17 and the third valve pocket 25 via the secondary control edge 35 (closed-loop control on the secondary control edge 35). An excess portion of the secondary oil flow generated by the secondary pump 7, which is not needed for maintaining the setpoint pressure level within the primary system pressure circuit 16, can now be directed into the secondary system pressure circuit 18 via the second valve pocket 17, the third valve pocket 25, and a third outlet 65 of the primary system pressure valve 9 connected to the third valve pocket 25. In this way, a pressure can be built up within the secondary system pressure circuit 18.

The secondary pump 7 also continues to deliver into the primary system pressure circuit 16 via the second valve pocket 17, however. The setpoint pressure level of the primary system pressure circuit 16 is maintained by the primary pump 6 and the secondary pump 7. In the second switching position of the piston rod 11 shown in FIG. 5, the radially outer surface 30 of the second piston 31 of the piston rod 11 still rests against the first section 27 of the guide surface 26. The radially outer surface 30 of the second piston 31 still closes a possible connection between the first valve pocket 14 and the third valve pocket 25 via the primary control edge 36. The primary pump 6 therefore continues to delivers the primary oil flow only into the primary system pressure circuit 16.

The secondary system pressure valve 37 is a pressure control valve, which is configured for adjusting and limiting the pressure prevailing within the secondary system pressure circuit 18. The secondary system pressure valve 37 includes a secondary piston rod 41, which, in the operating conditions of the hydraulic system 4 shown in FIGS. 2 through 5, is in a starting position preloaded by a second spring 38, since the amount of oil in the secondary system pressure circuit 18 does not yet suffice for reaching an intended low pressure level. For the sake of greater clarity, a few reference characters of the secondary system pressure valve 37 are shown only in the enlarged representation in FIG. 7.

In the starting position according to FIG. 2, a piston 42 of the secondary piston rod 41 closes a possible connection between the secondary system pressure circuit 18 and a line 39, which leads to a pump suction side 40. In detail, the secondary system pressure valve 37 includes a secondary valve body 43, which forms a secondary guide surface 44 for guiding the secondary piston rod 41 in an axial direction L of the secondary system pressure valve 37. In addition, the secondary valve body 43 forms a first valve pocket 45 and a second valve pocket 46.

The first valve pocket 45 and the second valve pocket 46 can each extend farther outward in a radial direction r of the secondary system pressure valve 37 than the secondary guide surface 44 for the secondary piston rod 41. The secondary guide surface 44 can have a slightly larger diameter than the secondary piston rod 41 with a piston 42, and so the secondary piston rod 41 can be displaced back and forth within the secondary guide surface 44 in the axial direction L of the secondary system pressure valve 37 in the most friction- and wear-free manner possible. A section 47 of the secondary guide surface 44 extends from the first valve pocket 45 to the second valve pocket 46.

In the starting position of the secondary piston rod 41 shown in FIGS. 2 through 5, the piston 42 of the secondary piston rod 41 closes a possible connection between the first valve pocket 45 and the second valve pocket 46 via a control edge 48, which is formed by the piston 42. In the opening position of the secondary piston rod 41 shown in FIG. 6 (see also the enlarged representation in FIG. 7), however, the piston 42 of the secondary piston rod 41 releases the connection between the first valve pocket 45 and the second valve pocket 46 via the control edge 48.

On a first end surface 49 of the secondary system pressure valve 37, the secondary piston rod 41 includes a cup-shaped piston 50. The spring 38 generates a spring force, which acts upon an inner hydraulically effective circular surface 51 of the cup-shaped piston 50. The spring force acts in the axial direction L and is oriented in the direction of a second end surface 52 of the secondary system pressure valve 37. A first inlet 53 of the secondary system pressure valve 37 is connected to the primary system pressure circuit 16 via a second restrictor 54. The first inlet 53 opens into a third valve pocket 55, which is formed by the secondary valve body 43. The third valve pocket 55 is connected to an interior space 56 of the cup-shaped piston 50. Oil from the primary system pressure circuit 16 can therefore enter the interior space 56 of the cup-shaped piston 50 via the second restrictor 54, the first inlet 53, and the third valve pocket 55. The oil can fill the third valve pocket 55 and the interior space 56 of the cup-shaped piston 50 and build up a hydraulic pressure within the interior space 56. This hydraulic pressure can act, in particular, upon the inner hydraulically effective circular surface 51 of the cup-shaped piston 50. A secondary pilot force corresponding to this hydraulic pressure acts in the same direction and, as a result, strengthens the spring force generated by the spring 38.

A second inlet 57 of the secondary system pressure valve 37 is connected on the one side to the secondary system pressure circuit 18. On the other side, the second inlet 57 is connected to the first valve pocket 45. A third inlet 58 of the secondary system pressure valve 37 is connected on the one side, via a third restrictor 59, to the secondary system pressure circuit 18. On the other side, the third inlet 58 is connected to a fourth valve pocket 60.

The secondary piston rod 41 forms a hydraulically effective end surface 61 in the area of the second end surface 52 of the secondary system pressure valve 37. Oil from the secondary system pressure circuit 18 can enter the fourth valve pocket 60 via the third restrictor 59 and the third inlet 58. The oil can fill the fourth valve pocket 60 and build up a pressure within the fourth valve pocket 60. This pressure can act upon the hydraulically effective end surface 61 of the secondary piston rod 41, as the result of which a displacement force is induced, which acts counter to a force resulting from the spring force of the spring 38 and to the secondary pilot force, which is induced by the throttled pressure of the primary system pressure circuit 16.

In the operating conditions of the hydraulic system 4 shown in FIGS. 2 through 5, an equilibrium of forces exists between the spring force of the spring 38 and the secondary pilot force, on the one hand, and the displacement force, on the other hand, which is induced by the oil pressure within the fourth valve pocket 60. This equilibrium of forces exists, provided the spring force of the spring 38 and the pilot force are greater than the displacement force. This is the case for as long as it takes until the pressure within the secondary system pressure circuit 18 has reached a predefined setpoint pressure level (which is predefined by the spring force and the pilot force).

An outlet 62 of the secondary system pressure valve 37 is connected on the one side to the second valve pocket 46. On the other side, the outlet 62 is connected to the line 39, which leads to the pump suction side 40, i.e., the line 39 leads to an inlet 59 of the pump system 5. Via this inlet 59, oil can be additionally supplied to the primary pump 6 as well as to the secondary pump 7. In the operating conditions of the hydraulic system 4 shown in FIGS. 2 through 5, the secondary piston rod 41 of the secondary system pressure valve 37 is in the starting position. The piston 42 of the secondary piston rod 41, in the starting position of the secondary piston rod 41, closes the possible connection between the first valve pocket 45 and the second valve pocket 46 via the control edge 48. Thus, there is also no connection between the second inlet 57 and the outlet 62. Consequently, no oil can flow out of the secondary system pressure circuit 18 into the line 39 via the second inlet 57, the first valve pocket 45, the second valve pocket 46, and the outlet 62, and be supplied to the inlet 59 of the pump system 5.

Starting from the operating condition of the hydraulic system 4 according to FIG. 5, the rotational speed of the pump system 5 is further increased, until the delivery rate and/or the primary oil flow of the primary pump 6 suffices such that the primary pump 6 alone can saturate the primary system pressure circuit 16, i.e., can solely maintain the setpoint pressure level within the primary system pressure circuit 16 (primary saturation condition). When this primary saturation condition has been reached, the delivery rate and/or the secondary oil flow of the secondary pump 7 is no longer needed in order to saturate the primary system pressure circuit 16. In the primary saturation condition, the piston rod 11 is displaced by the displacement force in the direction of the first end surface 51 of the primary system pressure valve 9 to such an extent that the piston rod 11 is in a third switching position according to FIG. 6.

In the fourth operating condition of the hydraulic system 4 shown in FIG. 6, the rotational speed of the primary pump 6 and of the secondary pump 7 were further increased (in comparison to the operating condition of the hydraulic system 4 according to FIG. 5). As a result, the delivery rate of the primary pump 6 and of the secondary pump 7 has increased. The pressure prevailing within the primary system pressure circuit 16 and the displacement force, which acts upon the hydraulically effective end surface 33 of the piston rod 11 of the primary system pressure valve 9, have also increased. Thus, the piston rod 11 has moved farther in the direction of the first end surface S1 of the primary system pressure valve 9. As a result, the connection between the second valve pocket 17 and the third valve pocket 25 via the secondary control edge 35 has expanded.

In the third switching position of the piston rod 11 shown in FIG. 6, the radially outer surface 30 of the piston 31 no longer rests against the first section 27 of the guide surface. Therefore, the piston 31 releases the connection between the first valve pocket 14 and the third valve pocket 25 via the primary control edge 36 (closed-loop control on the primary control edge 36). As soon as the piston rod 11 is in the third switching position, the primary system pressure valve 9 controls, by way of a closed-loop system, by the primary control edge 36 and no longer by the secondary control edge 35. The connection between the second valve pocket 17 and the third valve pocket 25 via the secondary control edge 35 continues to exist, and so the excess delivery and/or the primary oil flow of the primary pump 6 and the delivery and/or the secondary oil flow of the secondary pump 7 are now combined in the third valve pocket 25 and directed into the secondary system pressure circuit 18 in order to increase the pressure within in the secondary system pressure circuit 18.

In other words, an excess portion of the primary oil flow generated by the primary pump 6, which is not needed for maintaining the setpoint pressure level within the primary system pressure circuit 16, can now be directed into the secondary system pressure circuit 18 via the first valve pocket 14, the third valve pocket 25, and the third outlet 65 of the primary system pressure valve 9.

In addition, in the third switching position of the piston rod 11, the pressure in the secondary oil flow delivered by the secondary pump 7 initially drops, because the cross-section increases at the secondary control edge 35. Due to the pressure drop, an imbalance of forces arises at the second retention valve 19. The setpoint pressure level of the primary system pressure circuit 16 is present on the side of the primary system pressure circuit 16. The pressure is lower on the side of the primary system pressure valve 9 due to the above-described pressure drop. As a result, the second retention valve 19 closes. Thus, the primary system pressure circuit 16 and the secondary system pressure circuit 18 are separated from each other. The secondary pump 7 now delivers oil only into the secondary system pressure circuit 18. Once the above-described pressure drop has occurred, the pressure in the secondary pump 7 is reduced.

In the fourth operating condition of the hydraulic system 4 shown in FIG. 6, the rotational speed of the primary pump 6 and of the secondary pump 7 are further increased (in comparison to the operating condition of the hydraulic system 4 according to FIG. 5). As a result, the delivery rates of the primary pump 6 and of the secondary pump 7 increase. The pressure prevailing within the secondary system pressure circuit 18 and the displacement force, which acts upon the hydraulically effective end surface 61 of the secondary piston rod 41 of the secondary system pressure valve 37, also increase.

This continues until the secondary system pressure circuit 18 is saturated, i.e., until the setpoint pressure level within the secondary system pressure circuit 18 has been reached (secondary saturation condition). Once the secondary saturation condition has been reached, the secondary piston rod 41 moves, due to the imbalance of forces now prevailing, in the direction of the first end surface 49 of the secondary system pressure valve 9 until the secondary piston rod 41 is in the opening position shown in FIGS. 6 and 7, in which the connection between the first valve pocket 45 and the second valve pocket 46 is released via the control edge 48. The secondary system pressure valve 37 enters into closed-loop control. Now, an excess amount of oil (i.e., an amount of oil that is not needed for saturating the secondary system pressure circuit 18) from the secondary system pressure circuit 18 can be delivered into the line 39 via the second inlet 57, the first valve pocket 45, the second valve pocket 46, and the outlet 62 of the secondary system pressure valve 37, and, from there, supplied to the pump suction side 40.

FIG. 8 shows an alternative embodiment of a primary system pressure valve 9 for the hydraulic system according to FIG. 2. In this primary system pressure valve 9, a pressure return is implemented via an internal return surface 66, as the result of which the primary system pressure valve 9 according to FIG. 8 can be designed to be shortened in comparison to the primary system pressure valve 9 according to FIG. 2. The piston rod 11 in the exemplary embodiment according to FIG. 2 and in the exemplary embodiment according to FIG. 8 includes a third piston 67, which is arranged at a distance from the second piston 31 farther in the direction of the second end surface S2 of the primary system pressure valve 9. The diameter of the third piston 67 in the exemplary embodiment according to FIG. 8 is smaller than the diameter of the second piston 31.

The third piston 67 according to FIG. 8 can be displaced back and forth in the axial direction L of the primary system pressure valve 9 in a third section 68 of the guide surface 26 adapted to the reduced diameter of the third piston 67. The third piston 67 includes a hydraulically effective surface 69 (an annular surface in the exemplary embodiment shown), which is smaller than the return surface 66.

The primary oil flow generated by the primary pump 6 can enter the first valve pocket 14 of the primary system pressure valve 9 via the first inlet 8. The first valve pocket 14 can be flooded by the primary oil flow and, by the primary oil flow, a pressure can be built up within the first valve pocket 14. This pressure within the first valve pocket 14 varies depending on which of the operating conditions described above in conjunction with FIGS. 2 through 6 the hydraulic system 4 is in.

The pressure within the first valve pocket 14 acts upon the hydraulically effective surface 69 of the third piston 67 as well as upon the return surface 66 of the second piston 31. Since the hydraulically effective surface 69 of the third piston 67 is smaller than the return surface 66 of the second piston 31, the pressure within the first valve pocket 14 induces a displacement force, which counters the above-described spring force of the spring and the pilot force. The embodiment according to FIG. 8 makes it possible to save a sixth valve pocket 70 contained in the embodiment according to FIG. 2.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

Fi oil filter
L axial direction of a primary system pressure valve
r radial direction of the primary system pressure valve
S1 first end surface of the primary system pressure valve
S2 second end surface of the primary system pressure valve
1 motor vehicle
2 internal combustion engine
3 automatic transmission
4 hydraulic system
5 pump system
6 primary pump
7 secondary pump
8 first inlet of the system pressure valve
9 primary system pressure valve
10 second inlet of the system pressure valve
11 piston rod of the system pressure valve
12 spring
13 oil sump
14 first valve pocket of the system pressure valve
15 first retention valve
16 primary system pressure circuit
17 second valve pocket of the system pressure valve
18 secondary system pressure circuit
19 second retention valve
20 system pressure regulator 21 hydraulically effective, inner circular surface of a cup-shaped piston
22 cup-shaped piston of the primary system pressure valve
23 variably adjustable, electric pressure control valve
24 solenoid
25 third valve pocket of the system pressure valve
26 inner guide surface for the piston rod
27 first section of the guide surface
28 second section of the guide surface
29 radially outer surface of the cup-shaped piston
30 radially outer surface of a second piston
31 second piston of the primary system pressure valve
32 fourth valve pocket of the system pressure valve
33 hydraulically effective end surface of the piston rod
34 first restrictor
35 secondary control edge
36 primary control edge
37 secondary system pressure valve
38 second spring
39 line
40 pump suction side
41 secondary piston rod
42 secondary piston
43 secondary valve body
44 secondary guide surface for the secondary piston rod
45 first valve pocket
46 second valve pocket
47 section of the secondary guide surface
48 control edge of the secondary valve body
49 first end surface of the secondary system pressure valve
50 cup-shaped piston of the secondary system pressure valve
51 hydraulically effective, inner circular surface of the cup-shaped piston
52 second end surface of the secondary system pressure valve
53 first inlet of the secondary system pressure valve
54 second restrictor
55 third valve pocket
56 interior space of the cup-shaped piston
57 second inlet of the secondary system pressure valve
58 third inlet of the secondary system pressure valve
59 third restrictor
60 fourth valve pocket
61 hydraulically effective end surface of the secondary piston rod
62 outlet of the secondary system pressure valve
63 inlet of the pump system
64 third inlet of the primary system pressure valve
65 third outlet of the primary system pressure valve
66 annular surface of the second piston of the primary system pressure valve
67 third piston
68 third section of the guide surface of the primary system pressure valve
69 hydraulically effective surface of the third piston
70 sixth valve pocket of the primary system pressure valve
71 valve housing
72 first outlet of the primary system pressure valve
73 second outlet of the primary system pressure valve
74 fourth inlet of the primary system pressure valve
75 fifth valve pocket of the primary system pressure valve
76 interior space of the cup-shaped piston of the primary system pressure valve

The invention claimed is:

1. A system pressure valve (9) for a hydraulic system (4) of a motor vehicle transmission (3), comprising:
a valve housing (71);
a piston rod (11);
a first inlet (8);
a second inlet (10);
a first outlet (72);
a second outlet (73); and
a third outlet (65),
wherein a primary pump (6) of the hydraulic system (4) is connectable to the first inlet (8),
wherein a secondary pump (7) of the hydraulic system (4) is connectable to the second inlet (10);
wherein a primary system pressure circuit (16) of the hydraulic system (4) is connectable to the first outlet (72) and to the second outlet (73),
wherein a secondary system pressure circuit (18) of the hydraulic system (4) is connectable to the third outlet (65),
wherein the system pressure valve (9) is configured for displacing the piston rod (11) within the valve housing (71) into a first switching position, into a second switching position, and into a third switching position,
wherein, in the first switching position, the third outlet (65) is connected neither to the first inlet (8) nor to the second inlet (10),
wherein, in the second switching position, the second inlet (10) is connected to the third outlet (65), and
wherein, in the third switching position, the third outlet (65) is connected to the first inlet (8) as well as to the second inlet (10).

2. The system pressure valve (9) of claim 1, wherein the piston rod (11) is preloaded in the first switching position by a restoring element (12).

3. The system pressure valve (9) of claim 1, wherein the piston rod (11) within the valve housing (71) is displaceable into the second switching position or into the third switching position by a hydraulic pressure acting upon an end surface (33) of the piston rod (11).

4. The system pressure valve (9) of claim 1, wherein the piston rod (11) within the valve housing (71) is displaceable into the second switching position or into the third switching position by hydraulic pressure acting upon an internal return surface (66) of a piston (31) of the piston rod (11).

5. The system pressure valve (9) of claim 1, wherein the piston rod (11) within the valve housing (71) is displaceable out of the first switching position into the second switching position by a hydraulic pressure that loads the piston rod (11) as soon as the hydraulic pressure exceeds a first limiting value.

6. The system pressure valve (9) of claim 5, wherein the piston rod (11) within the valve housing (71) is displaceable out of the second switching position into the third switching position by the hydraulic pressure that loads the piston rod (11) as soon as the hydraulic pressure exceeds a second limiting value, wherein the second limiting value is greater than the first limiting value.

7. The system pressure valve (9) of claim 1, further comprising:
a first valve pocket (14) connected to the first inlet (8) and to the first outlet (72);
a second valve pocket (17) connected to the second inlet (10) and to the second outlet (73); and
a third valve pocket (25) connected to the third outlet (65), wherein the piston rod (11) separates the first valve pocket (14) and the second valve pocket (17) from the third valve pocket (25) in the first switching position, wherein the piston rod (11) releases a connection of the second valve pocket (17) to the third valve pocket (25) in the second switching position, and wherein the piston rod (11) releases a connection between the first valve pocket (14) and the third valve pocket (25) as well as a connection between the second valve pocket (17) and the third valve pocket (25) in the third switching position.

8. The system pressure valve (9) of claim 7, wherein the first piston rod comprises:

a piston (31) with a primary control edge (36); and a further piston (22) with a secondary control edge (35), wherein the piston rod (11) is configured for releasing the connection between the second valve pocket (17) and the third valve pocket (25) via the secondary control edge (35), and wherein the piston rod (11) is configured for releasing the connection between the first valve pocket (14) and the third valve pocket (25) via the primary control edge (36).

9. A hydraulic system (4) for an automatic motor vehicle transmission (3), comprising: the system pressure valve (9) of claim 1.

10. The hydraulic system (4) of claim 9, further comprising a system pressure regulator (20) configured for outputting a pilot pressure, the pilot pressure suppliable to the primary system pressure valve (9) to support a preload force of the restoring element (12).

11. The hydraulic system (4) of claim 9, further comprising an additional system pressure valve (37) configured for predefining and setting a system pressure within the secondary system pressure circuit (18) and connecting the secondary system pressure circuit (18) to a suction side (40) of the primary pump (6) and of the secondary pump (7) when the predefined system pressure is exceeded.

12. An automatic motor vehicle transmission (3), comprising the hydraulic system (4) of claim 9.

13. A motor vehicle (1), comprising the automatic motor vehicle transmission (3) of claim 12.

* * * * *